(12) United States Patent
Yazdanfar et al.

(10) Patent No.: US 8,179,432 B2
(45) Date of Patent: May 15, 2012

(54) PREDICTIVE AUTOFOCUSING

(75) Inventors: Siavash Yazdanfar, Niskayuna, NY (US); Robert John Filkins, Niskayuna, NY (US); Elizabeth Lockenberg Dixon, Delanson, NY (US); Walter Vincent Dixon, legal representative, Delanson, NY (US); Krenar Tasimi, Latham, NY (US); Kevin Bernard Kenny, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1154 days.

(21) Appl. No.: 11/843,754

(22) Filed: Aug. 23, 2007

(65) Prior Publication Data

US 2008/0266440 A1    Oct. 30, 2008

Related U.S. Application Data

(63) Continuation-in-part of application No. 11/741,839, filed on Apr. 30, 2007, now Pat. No. 7,576,307.

(51) Int. Cl.
*H04N 5/225* (2006.01)
*H04N 5/232* (2006.01)

(52) U.S. Cl. .......... 348/79; 348/345; 348/350; 348/340; 359/363; 250/201.3; 250/201.2

(58) Field of Classification Search .................... 348/79, 348/345, 363, 340, 349, 350
See application file for complete search history.

(56) References Cited

U.S. PATENT DOCUMENTS

| | | | |
|---|---|---|---|
| 5,151,609 A | 9/1992 | Nakagawa et al. | |
| 6,611,282 B1 | 8/2003 | Trubko et al. | |
| 6,677,565 B1 | 1/2004 | Wahl et al. | |
| 6,760,154 B1 | 7/2004 | Focht | |
| 6,879,440 B2 | 4/2005 | Cemic et al. | |
| 7,177,454 B2 | 2/2007 | McLaren et al. | |
| 7,576,307 B2* | 8/2009 | Yazdanfar et al. | ......... 250/201.3 |
| 2002/0114497 A1 | 8/2002 | Wetzel et al. | |
| 2005/0109959 A1 | 5/2005 | Wasserman et al. | |
| 2005/0121596 A1 | 6/2005 | Kam et al. | |
| 2006/0098861 A1* | 5/2006 | See et al. | ...................... 382/145 |
| 2007/0069106 A1 | 3/2007 | Krief et al. | |
| 2008/0219654 A1* | 9/2008 | Border et al. | ................... 396/89 |

FOREIGN PATENT DOCUMENTS

EP    1610166    12/2005

(Continued)

OTHER PUBLICATIONS

Bravo-Zanoguera et al., "High-Performance Autofocus Circuit or Biological Microscopy", Review of Scientific Instruments, Vo 69, No. 11, pp. 3966-3977, Nov. 1998.

(Continued)

*Primary Examiner* — Jude Jean Gilles
(74) *Attorney, Agent, or Firm* — Jason K. Klindtworth

(57) ABSTRACT

A method of autofocusing includes capturing first, second and third images of a sample, at respective first, second and third sample distances and respective first, second and third lateral positions determined with respect to an objective; determining a quantitative characteristic for the first, second and third images; determining a primary sample distance based upon at least the quantitative characteristics for the first, second, and third images; and capturing a primary image of the sample at the primary sample distance and at a primary lateral position that is offset from the first, second and third lateral positions.

21 Claims, 7 Drawing Sheets

FOREIGN PATENT DOCUMENTS

| | | |
|---|---|---|
| WO | WO9610196 | 4/1996 |
| WO | WO0043820 | 7/2000 |
| WO | WO2006024967 | 3/2006 |

OTHER PUBLICATIONS

Sun et al., "Autofocusing in Computer Microscopy: Selectiing the Optimal Focus Algorithm", Microscopy Research and Technique, Vo.l 65, pp. 139-149, Oct. 2004.

Bocker, W., et al., A Fast Autofocus Unit for Fluorescence Microscopy: Phys. Med. Biol., vol. 42, pp. 1981-1992, 1997.

Nayar, S. et al., "Shape from Focus", IEEE Transactions on Pattern Analysis and Machine Intelligence, vol. 16, No. 8, Aug. 1994, pp. 824-831.

Sun, Yu, Duthaler< S. et al., "Autofocusing Algorithm Selection in Computer Microscopy", Department of Mechanical and Industrial Engineering, Institute of Biomaterials and Biomedical Eng. University of Toronto, and Institute of Robotics and Intelligent Systems, Zurich Switzerland, pp. 1-7.

Geusebrock, Jan-Mark et al., "Robust Autofocusing in Microscopy", Dept. of Computer Science, University of Amsterdam, Amsterdam, The Netherlands, Cytometry. 39:1-9 (2000), pp. 1-9.

PCT Search Report—Aug. 6, 2008.

* cited by examiner

PREDICTIVE AUTOFOCUSING

CROSS REFERENCE TO RELATED APPLICATIONS

This application is a continuation-in-part of U.S. patent application Ser. No. 11/741,839 entitled "MICROSCOPE WITH DUAL IMAGE SENSORS FOR RAPID AUTOFOCUSING", filed Apr. 30, 2007, which is herein incorporated by reference to the extent the disclosure of which does not conflict with the present application.

BACKGROUND

Embodiments of the present invention relate to imaging, and more particularly to predictive autofocusing of an imaging device.

High-density solid-state detector technology, coupled with affordable, terabyte and higher scale data storage, has greatly facilitated digital recording of industrial and medical images. In the biological and medical realm, digital microscopy has been used for such applications as high throughput screening, archiving, telemedicine, and rapid information retrieval. Digital microscopy is often advantageous over conventional light microscopy since hands-free operation of the microscope can increase throughput and reduce time and cost of operation. However, fully automated microscopy eliminates the optimization brought by a skilled human operator, such as the task of keeping the sample in focus during observation. Although microscopy samples are often relatively thin, on the order of a few micrometers, the high power objective lenses typically used for imaging have a depth of field that is even smaller. Accordingly, it is difficult to maintain the sample at the optimal focal position due to variations in the sample.

Conventional imaging devices perform autofocusing by directing a laser beam at the sample, measuring a reflection of the laser beam off the sample to provide a single reference point, and using a feedback loop to adjust the focal distance. Although this approach may provide rapid autofocusing, the single reference point may lack sufficient information for accurate autofocusing.

Conventional imaging devices also perform autofocusing by obtaining multiple images of a stationary sample at multiple focal distances, determining an optimal focal distance for each of the images and using a feedback loop to adjust the focal distance. Although this approach may provide more accurate autofocusing than the use of a laser beam, acquisition of the numerous images often creates time delays that prevent rapid autofocusing.

Therefore, there is a need for an imaging device that performs accurate rapid autofocusing in real-time image acquisition applications.

BRIEF DESCRIPTION

In one embodiment a method of autofocusing a sample to obtain a plurality of sequential primary images representative of the sample is described. The method comprises capturing a first auxiliary image of the sample at a first sample distance and at a first lateral position determined with respect to an objective, and determining a quantitative characteristic for the first auxiliary image. The method further comprises capturing a second auxiliary image of the sample at a second sample distance and at a second lateral position that is offset from the first lateral position, and determining a quantitative characteristic for a second auxiliary image. The method further comprises capturing a third auxiliary image of the sample at a third sample distance and at a third lateral position that is offset from the first and second lateral positions, and determining a primary sample distance based upon at least the quantitative characteristics for the first, second, and third auxiliary images. The method further comprises capturing a primary image of the sample at the primary sample distance and at a primary lateral position that is offset from the first, second and third lateral positions.

In another embodiment, an imaging device is provided. The imaging device comprises an image sensor that generates a plurality of sequential primary images of a sample, an objective lens, a stage that supports the sample to be imaged and a controller that adjusts a sample distance between the objective lens and the sample along an optical axis to autofocus the images as the relative positions of the sample and the objective lens are varied in a lateral direction substantially orthogonal to the optical axis. In one embodiment, the controller is configured to capture a first auxiliary image of the sample at a first sample distance and at a first lateral position, and determine a quantitative characteristic for the first auxiliary image. The controller is further configured to capture a second auxiliary image of the sample at a second sample distance and at a second lateral position that is offset from the first lateral position, and determine a quantitative characteristic for the second auxiliary image. The controller is further configured to capture a third auxiliary image of the sample at a third sample distance and at a third lateral position that is offset from the first and second lateral positions, and determine a primary sample distance based upon at least the quantitative characteristics for the first, second and third auxiliary images. The controller is further configured to capture a primary image of the sample at the primary sample distance and at a primary lateral position that is offset from the first, second and third lateral positions.

In a further embodiment, another imaging device is provided. The imaging device comprises an objective lens, a primary image sensor that generates a primary image of a sample at a primary frame rate, an auxiliary image sensor that generates an auxiliary image of the sample at an auxiliary frame rate that is faster than the primary frame rate, a controller that adjusts a sample distance between the objective lens and the sample along an optical axis to autofocus the image on the sample, a scanning stage to support the sample and move the sample in at least a lateral direction that is substantially orthogonal to the optical axis. In one embodiment, the controller adjusts the sample distance between the objective lens and the sample to obtain a plurality of auxiliary images at varied sample distances and successive lateral positions, determines a quantitative characteristic for each auxiliary image, determines a primary sample distance based on a curve fit of the quantitative characteristics for the auxiliary images, and adjusts the sample distance between the objective lens and the sample to the primary sample distance to autofocus the primary image on the sample.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, well known methods, procedures, and components have not been described in detail.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

In accordance with one or more embodiments of the present invention, a system and method for predictive autofocusing is described herein. In one embodiment, an imaging device generates multiple auxiliary images of a sample, determines quantitative characteristics for the auxiliary images, and determines a preferred distance between an objective lens and a sample based upon at least the determined quantitative characteristics. The term "sample distance" is used hereinafter to refer to the separation distance between the objective lens and the sample to be imaged. A quantitative characteristic represents a quantitative measure of image quality and may also be referred to as a quantitative figure of merit. In one embodiment, the objective lens and/or the sample are moved to obtain the determined sample distance and a primary image is thereafter captured at the determined sample distance. As used herein, the term "primary image" is used to refer to an image captured at a sample distance that is within the depth of focus of the objective lens for a given sample. In one embodiment, the auxiliary and primary images are captured while the sample is continuously moved through the field of view of the objective lens.

Figure 1:
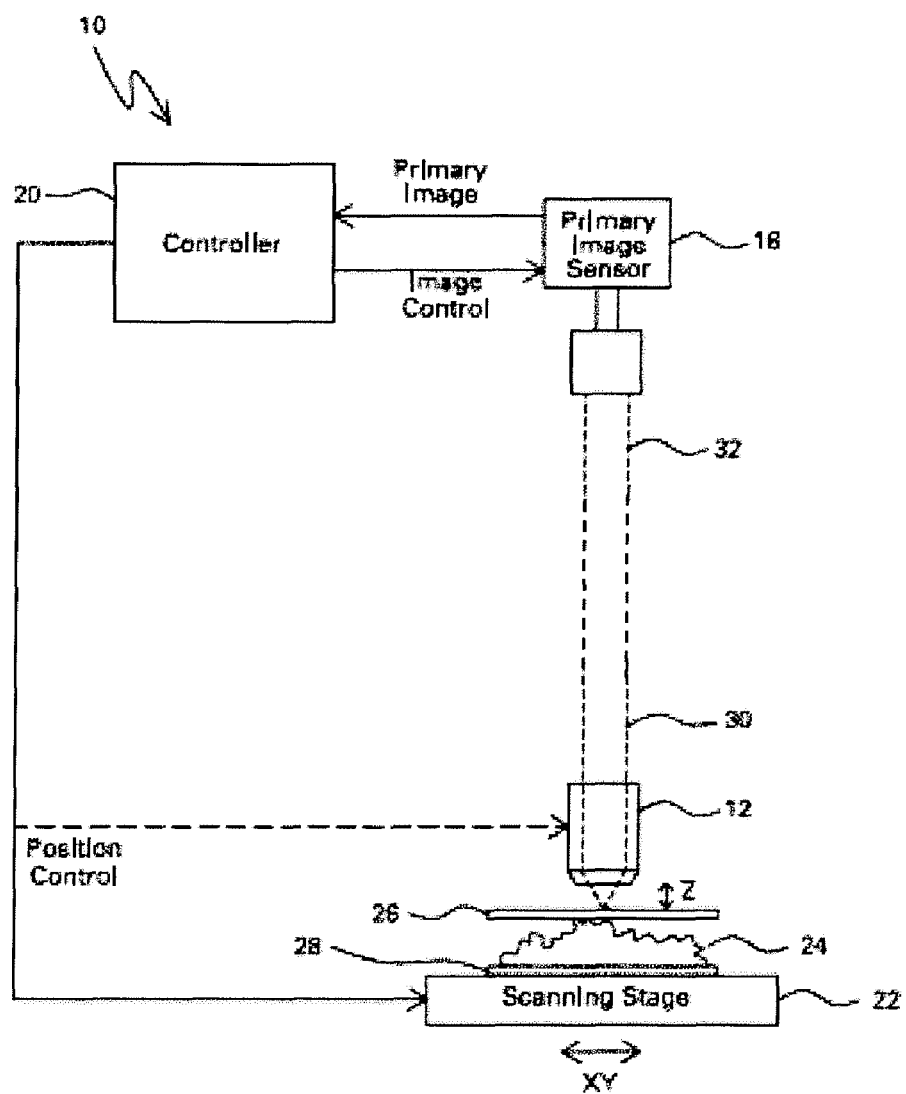
FIG. 1 illustrates one embodiment of an imaging device, such as a digital optical microscope, that incorporates aspects of the present invention.

FIG. 1 illustrates one embodiment of an imaging device 10, such as a digital optical microscope, that incorporates aspects of the present invention. The imaging device 10 includes an objective lens 12, a primary image sensor 16, a controller 20 and a scanning stage 22. In the illustrated embodiment, a sample 24 is disposed between a cover slip 26 and a slide 28, and the sample 24, the cover slip 26 and the slide 28 are supported by the scanning stage 22. The cover slip 26 and the slide 28 may be made of a transparent material such as glass, while the sample 24 may represent a wide variety of objects or samples including biological samples. For example, the sample 24 may represent industrial objects such as integrated circuit chips or microelectromechanical systems (MEMS), and biological samples such as biopsy tissue including liver or kidney cells. In a non-limiting example, such samples may have a thickness that averages 5 microns and varies by several microns and may have a lateral surface area of approximately 15×15 millimeters.

The objective lens 12 is spaced from the sample 24 by a sample distance that extends along an optical axis in the Z (vertical) direction, and the objective lens 12 has a focal plane in the X-Y plane (lateral or horizontal direction) that is substantially orthogonal to the Z or vertical direction. The objective lens 12 collects light 30 radiated from the sample 24 at a particular field of view, magnifies the light 30 and directs the light 30 to the primary image sensor 16. The objective lens 12 may vary in magnification power depending, for example, upon the application and size of the sample features to be imaged. The primary image sensor 16 may represent any digital imaging device such as a commercially available charge-coupled device (CCD) based image sensor. In one embodiment, the objective lens 12 may be a high power objective lens providing a 20× or greater magnification and a 0.5 numerical aperture (small depth of focus). The objective lens 12 may be spaced from the sample 24 by a sample distance of a few millimeters (also referred to as a long working distance) and may collect light 30 from a field of view of 750×750 microns in the focal plane. However, the working distance, field of view and focal plane may also vary depending upon the microscope configuration or characteristics of the sample 24 to be imaged.

The imaging device 10 can illuminate the sample 24 using a wide variety of imaging modes including bright field, phase contrast, differential interference contrast and fluorescence. Thus, light 30 can be transmitted or reflected from the sample 24 using bright field, phase contrast or differential interference contrast, or light 30 can be emitted from the sample 24 (fluorescently labeled or intrinsic) using fluorescence. Furthermore, light 30 can be generated using trans-illumination (where the light source and the objective lens 12 are on opposite sides of the sample 24) or epi-illumination (where the light source and the objective lens 12 are on the same side of the sample 24). As such, the imaging device 10 may further include a light source (such as a high intensity LED or a mercury or xenon arc or metal halide lamp) which has been omitted from the figures for convenience of illustration.

Figure 2:
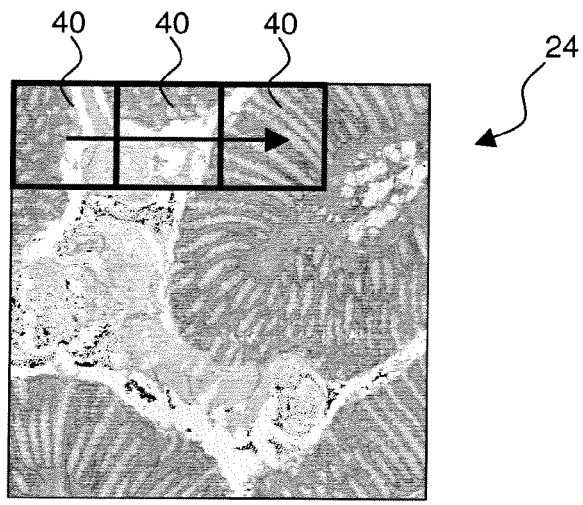
FIGS. 2-4 illustrate an image of a sample that has been deconstructed into a number of primary images in accordance with embodiments of the invention.
Figure 3:
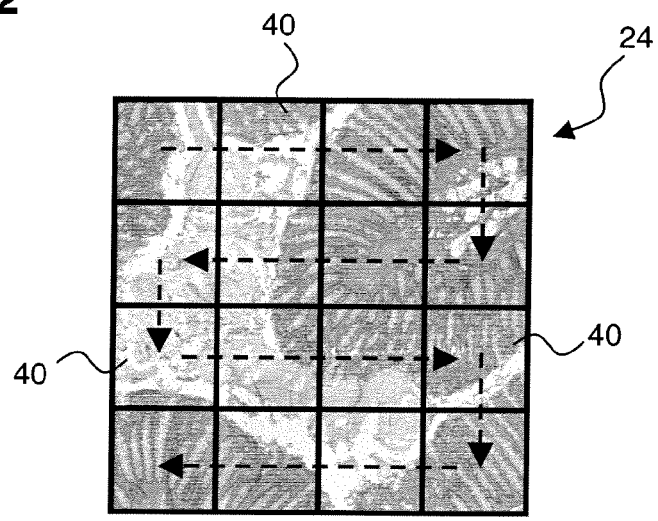
Figure 4:
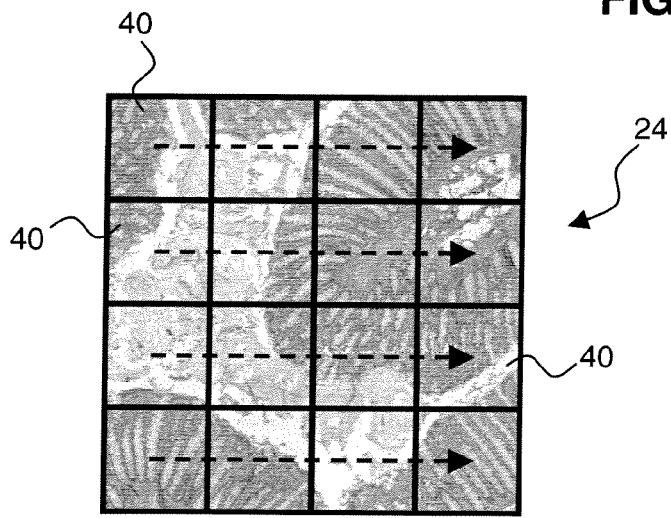

In one embodiment, the imaging device 10 may be a high-speed imaging device configured to rapidly capture a large number of primary digital images of the sample 24 where each primary image represents a snapshot of the sample 24 at a particular field of view representative of only a fraction of the entire sample. Each of the primary digital images may then be digitally combined or stitched together to form a digital representation of the entire sample 24. FIGS. 2-4 illustrate a digital representation of sample 24 that has been deconstructed into a number of primary images 40 in accordance with embodiments of the invention. As will be described in further detail, the relative lateral positions of the sample 24 and the objective lens 12 may be continuously varied during the imaging process so as to digitally capture the entire sample. In FIG. 3 the relative lateral positions of the sample 24 and the objective lens 12 are varied in a serpentine manner (as illustrated by dotted lines), whereas in FIG. 4, the relative lateral positions of the sample 24 and the objective lens 12 are varied in a raster scan manner. In combination, the primary images 40 form the entire digital representation of the sample 24.

In one embodiment, the primary image sensor 16 may generate a large number of primary and auxiliary images of the sample 24 at one or more fields of view using e.g., primary light path 32. In one embodiment, the imaging device 10 captures and utilizes multiple auxiliary images of the sample 24 at varying sample distances to autofocus a primary image of the sample. In one embodiment, controller 20 may adjust the distance between the objective lens 12 and the sample 24 to a preferred sample distance that is within the depth of focus so as to render the primary image. In one embodiment, the imaging device 10 stores the primary images and discards the auxiliary images.

Figure 5:
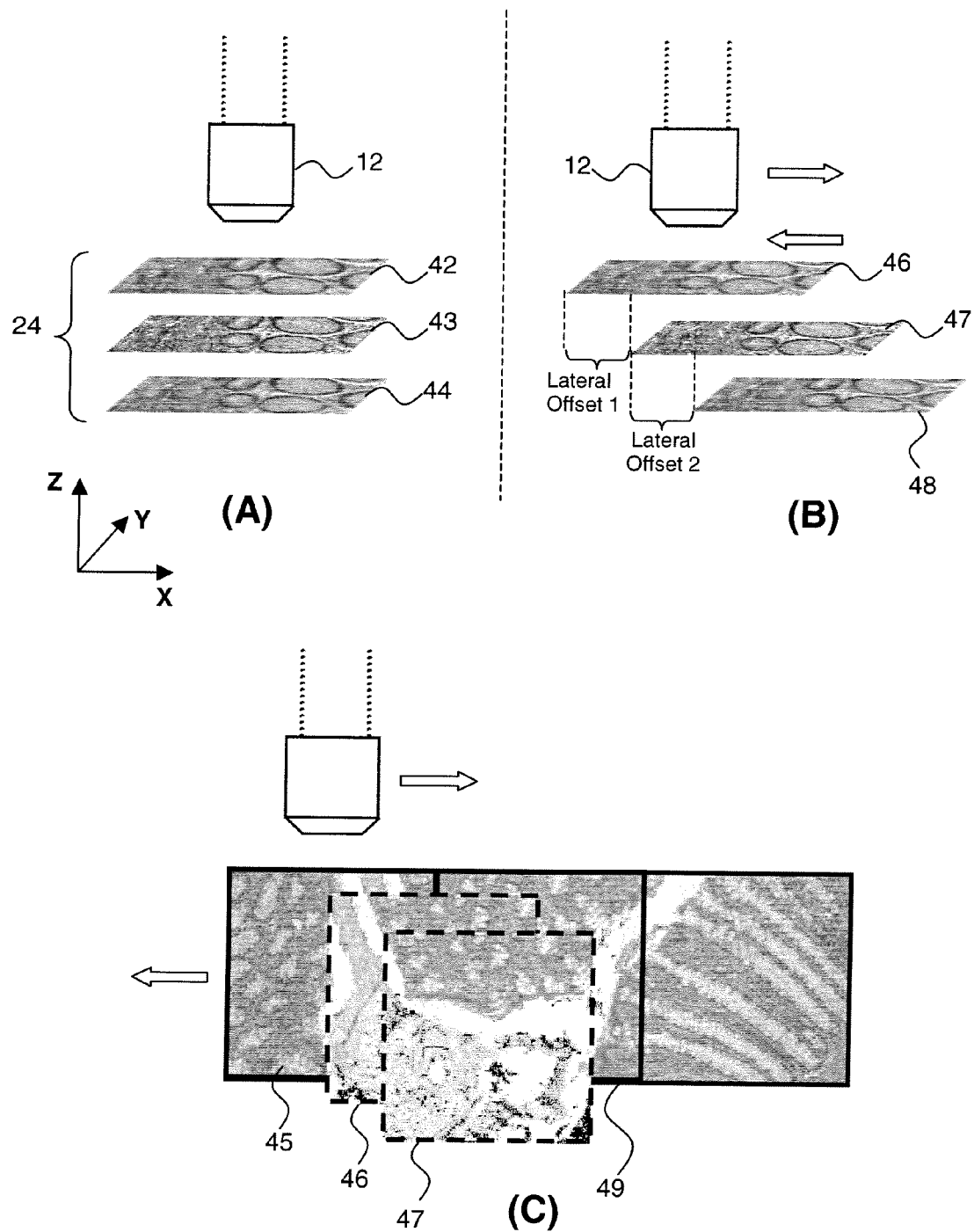
FIG. 5 is a schematic diagram illustrating the generation of primary and auxiliary images of a sample within the imaging device of FIG. 1 at one or more fields of view.

FIG. 5 is a schematic diagram illustrating a process for the generation of primary and auxiliary images of the sample 24 within the imaging device 10 of FIG. 1 at one or more fields of view. In FIG. 5(A), the controller 20 may vertically shift the objective lens 12 relative to the sample 24 in the Z direction to obtain multiple auxiliary images at multiple sample distances. For example, the controller 20 may vertically shift the objective lens 12 while the scanning stage 22 and the sample 24 remain at a fixed vertical position. Alternatively, the controller 20 may vertically shift the scanning stage 22 and the sample 24 while the objective lens 12 remains at a fixed vertical position, or the controller 20 may vertically shift both the scanning stage 22 (and the sample 24) and the objective lens 12. In one embodiment, the controller may move the relative vertical positions of the objective lens 12 and the sample 24 in at least three increments.

As illustrated in FIG. 5A, the imaging device 10 may capture a first auxiliary image 43 at a starting sample distance, capture a second auxiliary image 42 at a second sample distance and capture a third auxiliary image 44 at a third sample distance. In accordance with one embodiment, the imaging device 10 may then determine a preferred or optimal sample distance for the next primary image based upon characteristics of the first, second and third auxiliary images. The controller 20 may then move the scanning stage 22, the objective 12, or the scanning stage 22 and the objective 12 in the vertical direction to obtain the determined sample distance, where a primary image may be captured. It should be noted that the auxiliary images may be taken in any sequence and the focus plane need not correspond to the second image in order for the imaging device 10 to determine a preferred or optimal sample distance for the next primary image. For example, in the illustrated embodiment of FIG. 5A, the imaging device 10 may capture a first auxiliary image 42 at a starting sample distance, capture a second auxiliary image 44 at a second sample distance and capture a third auxiliary image 43 at a third sample distance. In yet another embodiment, the imaging device 10 may capture a first auxiliary image 44 at a starting sample distance, capture a second auxiliary image 43 at a second sample distance and capture a third auxiliary image 42 at a third sample distance.

As alluded to earlier, as part of a rapid imaging process, the position of the objective lens 12 relative to the sample 24 may be varied in a lateral direction across the area to be imaged. In accordance with one aspect of the present invention, the controller 20 may adjust the relative vertical positions of the objective lens 12 and the scanning stage 22 while the relative lateral positions of the objective lens 12 and the scanning stage 22 are continuously varied. In one embodiment, the scanning stage 22 may be moved laterally while the objective lens 12 is held stationary. Alternatively, the objective lens 12 may be moved laterally while the scanning stage 22 is held stationary, or both the objective lens 12 and the scanning stage 22 may be moved in opposite lateral directions. In one embodiment, the controller 20 may instruct the scanning stage 22 to laterally shift in the X-Y plane so that the field of view laterally shifts to a new (e.g., not yet imaged) region of the sample 24 (e.g., illustrated in FIG. 3 and FIG. 4). As illustrated in FIGS. 5B and 5C, the imaging device 10 may capture a first auxiliary image 46 at a starting sample distance and starting lateral position in relation to the objective lens 12. In rapid succession, the imaging device 10 may then capture a second auxiliary image 47 at a second sample distance and a second lateral offset, and capture a third auxiliary image 48 at a third sample distance and a third lateral offset. In one embodiment, a previously obtained primary image may be used as an auxiliary image for a subsequent primary image. With continuous relative movement of the sample 24 and the objective lens 12, each lateral offset will cause the primary and auxiliary images to vary from image to image. The lateral offset may differ by the same amount from one image to the next or the lateral offset may differ by varying amounts from image to image. In one embodiment, the lateral offset may be equivalent to as much as 33 percent of the field of view of the primary image.

In one embodiment, the imaging device 10 may determine a quantitative characteristic for the respective auxiliary images (e.g., 46, 47, 48) of the sample 24 captured at multiple sample distances. In one embodiment, the imaging device 10 may determine a primary sample distance based upon at least the quantitative characteristics determined for the multiple auxiliary images. In turn, the controller 20 may adjust the distance between the objective lens 12 and the primary image sensor 16 to the determined primary sample distance and the primary image sensor 16 may capture the next primary image 49. In accordance with one embodiment (as illustrated in FIG. 5C), a first primary image such as primary image 45 may be used as an auxiliary image along with auxiliary images 46 and 47 for a subsequent primary image 49. In doing so, the overall capture rate can be increased without any decrease in image quality.

In accordance with one embodiment of the present invention, the imaging device 10 may utilize quantitative characteristics as part of one or more focus algorithms as a basis to bring the sample into focus. Furthermore, the quantitative characteristic may have a maximum value at the optimal sample distance and decreasing value as the focus decreases, or alternatively, a minimum value at the optimal sample distance and increasing value as the focus decreases. Focus algorithms that use derivative-based quantitative characteristics assume that well-focused images have more high-frequency content than defocused images. Focus algorithms that use statistics-based quantitative characteristics distinguish focused images from defocused images using variance and correlation. Focus algorithms that use histogram-based quantitative characteristics use histograms (the number of pixels with a given intensity in an image) to analyze the distribution and frequency of image intensities. Focus algorithms that use intuitive quantitative characteristics sum the pixel intensities above a threshold. Thus, the quantitative characteristics can be based on a variety of image characteristics including, but not limited to contrast, entropy, variance, spatial frequency content, autocorrelation and total image intensity. Furthermore, the best quantitative characteristic may depend on the imaging mode. For instance, normalized variance may provide better overall performance for bright field, phase contrast and differential interference contrast, whereas autocorrelation may provide better overall performance for fluorescence. Likewise, the derivative-based Brenner gradient quantitative characteristic computes a first difference between a pixel and its neighbor with a horizontal/vertical distance of two and is well-suited for transmitted bright field imaging, for example.

Figure 6:
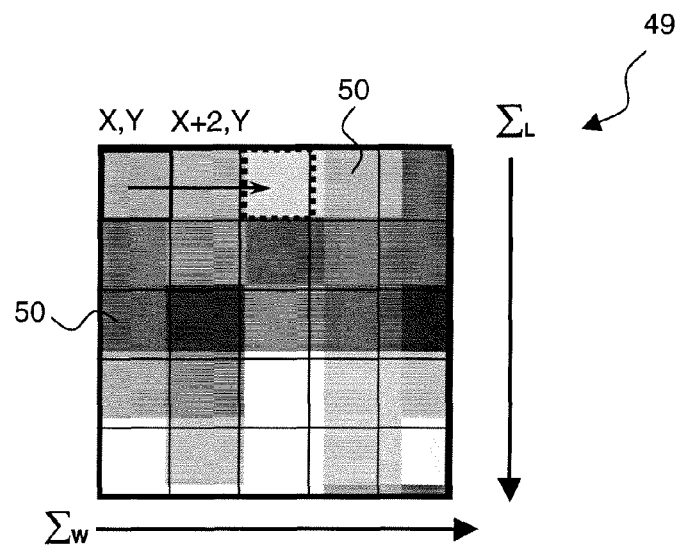
FIG. 6 illustrates one method of determining a quantitative characteristic for an auxiliary or primary image in accordance with one embodiment of the invention.

FIG. 6 illustrates one method of determining a quantitative characteristic for an auxiliary or primary image in accordance with one embodiment of the invention. In the illustrated embodiment, a primary image 49 is defined to have a length and width and is shown divided into a number of pixels 50. It should be noted that although the primary image 49 is illustrated as having the same number of pixels in the horizontal direction as it does in the vertical direction, the relative number of pixels in the horizontal and vertical directions may differ. Moreover, in FIG. 6, the illustrated size of the pixels has been greatly increased to show certain detail illustrated therein. It should be understood that the teachings described herein are equally applicable across all possible resolutions.

As previously mentioned, the Brenner gradient represents one specific method of determining a quantitative characteristic representing the level of focus for a particular image. The Brenner Gradient may be represented by the following relationship [1]:

$$F_{Brenner} = \sum_{Height} \sum_{Width} ((i(x+n), y) - i(x, y))^2, \quad [1]$$

where 'i' represents the intensity of a given pixel, n represents a small integer, and 'X' and 'Y' represent lateral pixel locations at a given sample distance. As applied to the primary image 49 of FIG. 6, the Brenner gradient focus algorithm would, for each pixel in the captured image, compute a difference in intensities between each respective pixel and a neighboring pixel laterally separated from the pixel by at least one other pixel, and sum the difference in intensities for each pixel across the height and width of the image.

As alluded to above, in accordance with one embodiment, the imaging device 10 may determine the optimal sample distance for a primary image based on the focus values of the quantitative characteristics for multiple auxiliary images. For example, the imaging device 10 may select the optimal sample distance based on the maximum quantitative characteristic of the auxiliary images, based on interpolation of a maximum focus value using the focus values of the auxiliary images, or by fitting at least three focus values to a distribution function and interpolating the maximum focus from the distribution function. In one embodiment, the imaging device 10 uses the Brenner Gradient with n=2 to determine respective quantitative characteristics for one or more auxiliary and primary images. In one embodiment, the imaging device 10 may interpolate the optimal sample distance for a primary image using quantitative characteristics for at least three other images as applied to a Lorentzian distribution. In another embodiment, the imaging device 10 may interpolate the optimal sample distance for a primary image using quantitative characteristics for at least three other images as applied to a Quadratic distribution. In the event the autofocus excursion (e.g., as determined by the sample distance) from one image to the next is relatively large with respect to the objective depth of focus, a Lorentzian distribution may provide a closer curve fit. In contrast, in the event the autofocus excursion is relatively small with respect to the objective depth of focus, a parabolic function may provide an adequate focus approximation. In an embodiment where a quadratic distribution is utilized, local maxima (or minima) may be determined by analysis of the second derivative of the figure of merit with respect to the sample distance to evaluate the robustness of the curve fit.

Figure 7:
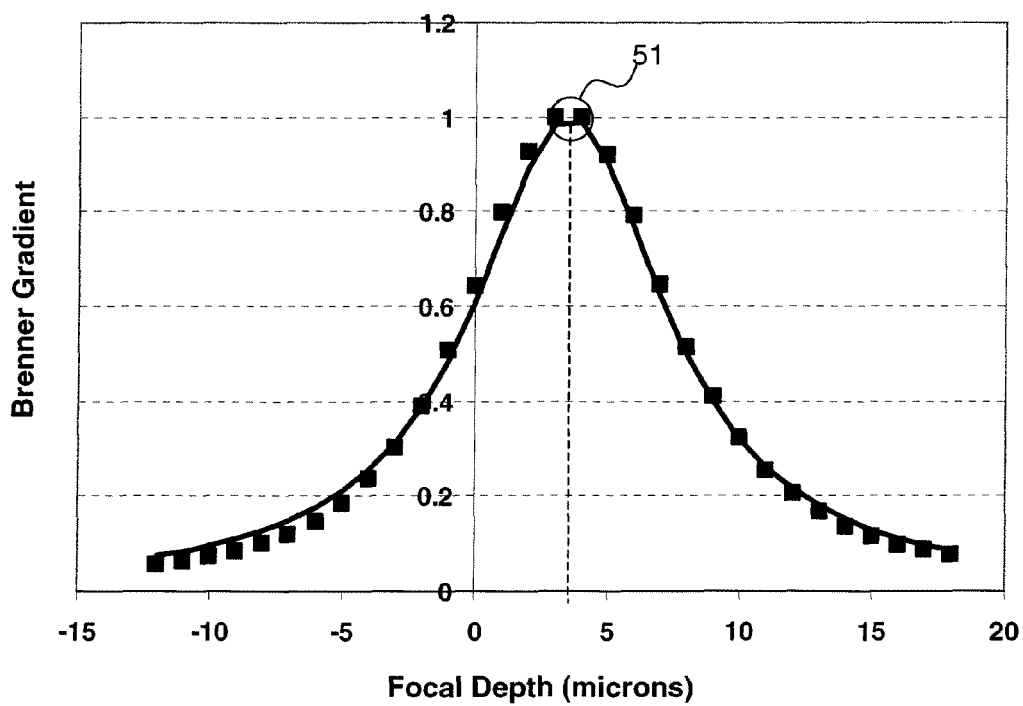
FIG. 7 is a plot illustrating quantitative characteristics in the form of Brenner Gradients plotted as a function of the position of the sample 24 for a series of images.

In accordance with one aspect of the present invention, it has been discovered that the relationship between Brenner Gradients for a series of images and the respective depth from focus for those images can be approximated by a Lorentzian distribution. FIG. 7 illustrates quantitative characteristics in the form of Brenner Gradients plotted as a function of the axial position of the sample 24 for a series of images. In the illustrated plot, the ordinate values represent the Brenner Gradients for a particular image, while the respective abscissa values represent the relative position of the lens 12 and the sample 24 for that particular image. The peak of the graph occurs at the position of the sample 24 located at the focus of the objective lens 12, and an abscissa value of zero corresponds to the relative position prior to focusing. In accordance with one embodiment, a preferred sample distance that is within the depth of focus for a particular image of a particular sample can be determined by identifying the maximum value of the Brenner Gradient on the plot shown in FIG. 7. For example, in FIG. 7, the preferred sample distance that would render an "in focus" image" corresponds to reference number 51. At this point, the distance between the objective lens 12 and the sample 24 is approximately 3.535 μm. It should be noted that although data for thirty images is illustrated in the plot of FIG. 7, the preferred sample distance that would render an in focus image can be determined from only three such images as was previously discussed.

Figure 8:
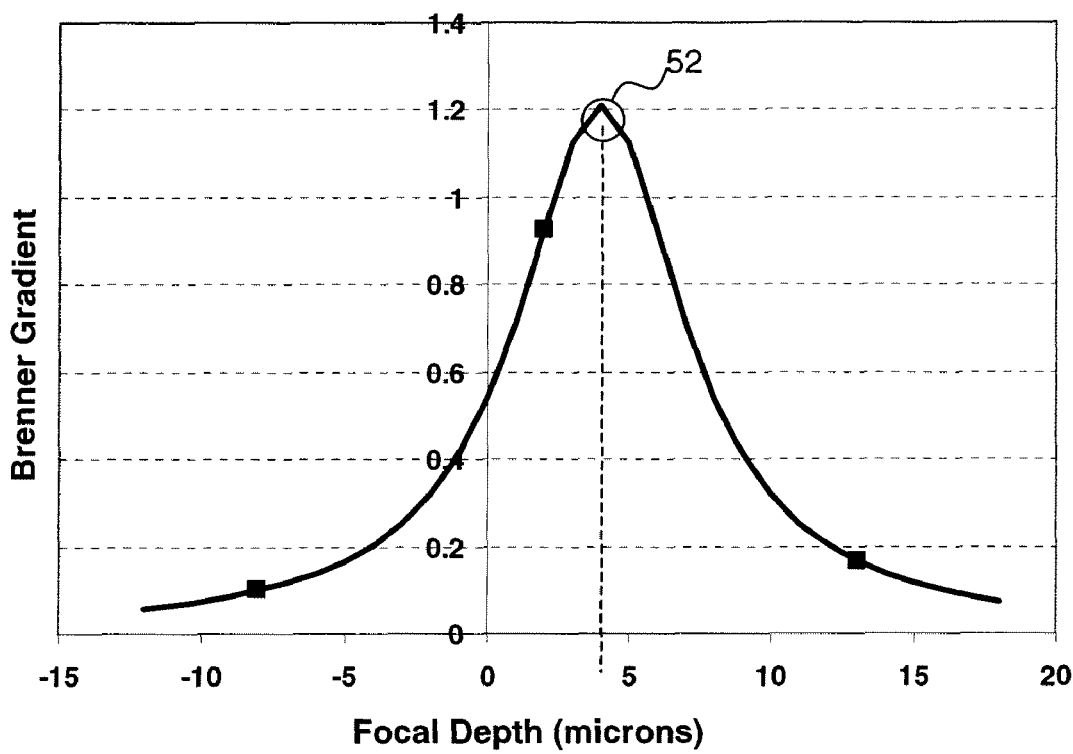
FIG. 8 is a plot that illustrates the Brenner Gradients plotted as a function of the relative position of the sample 24 for only three of the images associated with FIG. 7.
Figure 9:
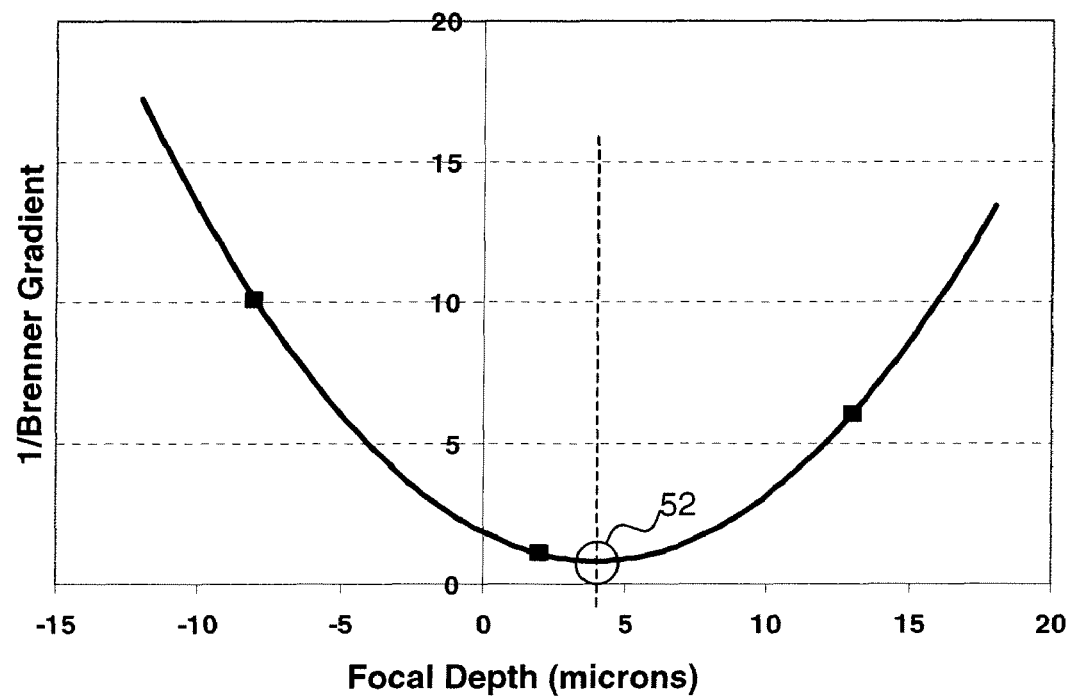
FIG. 9 is a plot that illustrates the inverse of the Brenner Gradients plotted as a function of the relative position of the sample 24 for three of the images associated with FIG. 7.

FIG. 8 illustrates the Brenner Gradients plotted as a function of the relative position of the sample 24 for only three of the images associated with FIG. 7. In FIG. 8, reference number 52 represents the preferred sample distance that would render an in focus image. Reference number 52 further represents a maximum value for the Brenner Gradients. At this point, the corresponding distance between the objective lens 12 and the sample 24 is approximately 3.996 μm. This only differs from the depth identified in FIG. 7 by 0.461 μm which is within the approximately 2 μm depth of focus for the objective lens 12. In accordance with one embodiment of the present invention, it has further been determined that a quadratic distribution can be approximated from a plot of the inverse of the Brenner Gradients for a series of images versus the respective position of the sample 24. Moreover, it has been found that a preferred sample distance that would render an in focus image corresponds to a minima on such a quadratic distribution. For example, FIG. 9 illustrates the inverse of the Brenner Gradients plotted as a function of the relative position of the sample 24 for three of the images associated with FIG. 7. It can be seen that the resulting distribution is quadratic in form and includes a minima indicated by reference number 52. This minima also corresponds to a distance between the objective lens 12 and the sample 24 that is approximately 3.996 μm.

Figure 10:
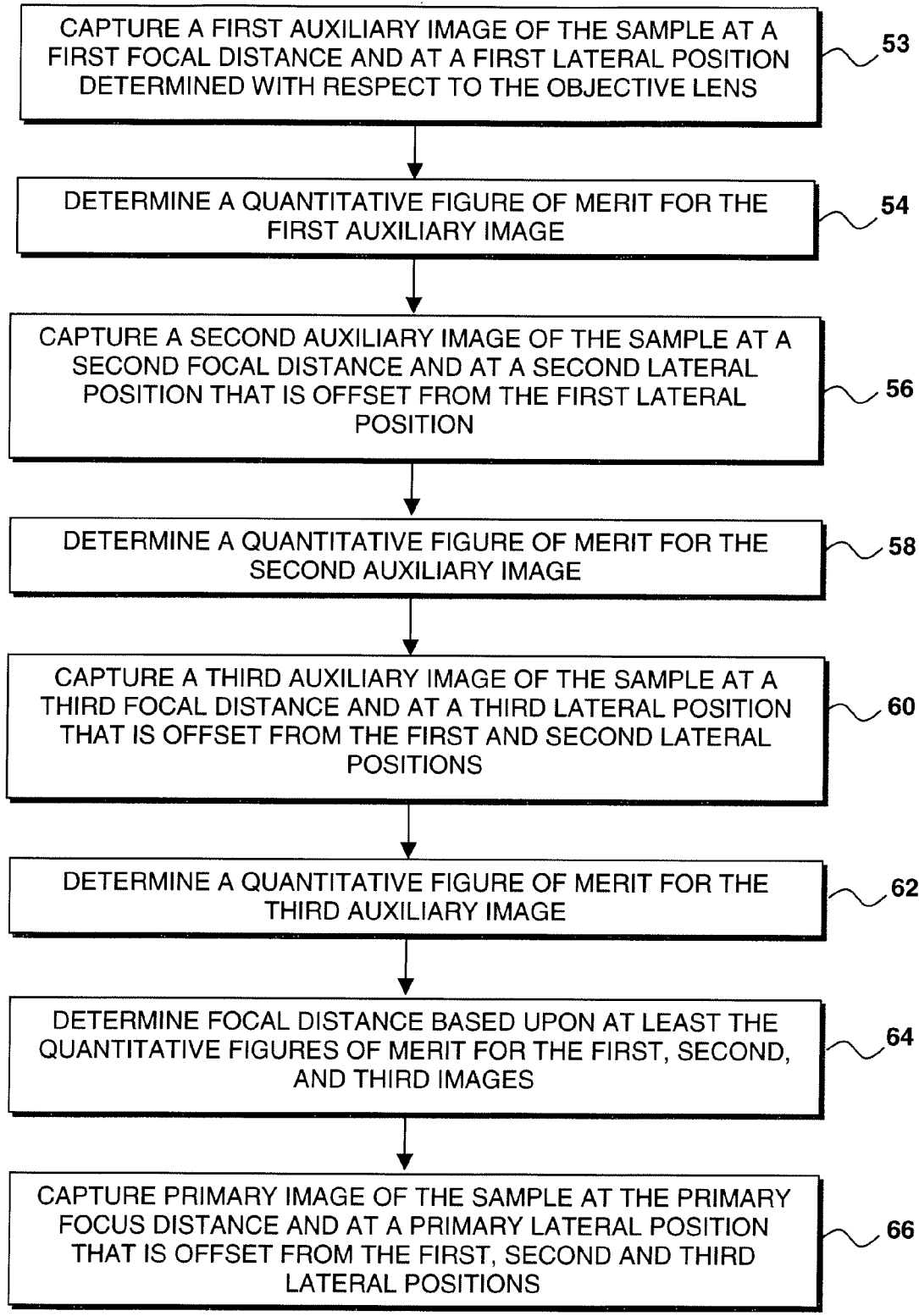
FIG. 10 is a block diagram illustrating an example operational flow for the imaging device of FIG. 1 in accordance with one embodiment of the invention.

FIG. 10 is a block diagram illustrating an example operational flow for the imaging device 10 in accordance with one embodiment of the invention. In one embodiment, the controller 20 may be configured to perform one or more of the illustrated functions. In the illustrated flow diagram, the imaging system captures a first auxiliary image of the sample 24 at a first sample distance and at a first lateral position determined with respect to the objective lens 12 (block 53), and determines a quantitative characteristic for the first auxiliary image (block 54). The imaging device 10 may then capture a second auxiliary image of the sample 24 at a second sample distance and at a second lateral position that is offset from the first lateral position (block 56), and then determine a quantitative characteristic for the second auxiliary image (block 58). The imaging device 10 may then capture a third auxiliary image of the sample 24 at a third sample distance and at a third lateral position that is offset from the first and second lateral positions (block 60), and determine a quantitative characteristic for the third auxiliary image (block 62). Next, a primary sample distance may be determined based upon at least the quantitative characteristics for the first, second, and third images (block 64). Finally, a primary image of the sample may be captured at the primary sample distance and at a primary lateral position that is offset from the first, second and third lateral positions (block 66).

In one embodiment, the controller 20 continues the scanning operation by laterally shifting the field of view to another region of the sample 24, obtaining multiple auxiliary images at multiple sample distances, determining the optimal sample distance, adjusting the objective lens 12 relative to the sample 24 to the optimal sample distance, thereby autofocusing the primary image on the sample 24, and then instructing the primary image sensor 16 to generate the primary image. In an example where the objective lens 12 has a field of view of 750×750 microns and the sample 24 has a lateral surface area of 15×15 millimeters, the primary image sensor 16 may generate roughly 400 primary images as the field of view traverses the sample 24.

The controller 20 can implement the autofocusing operation using various combinations of hardware and software. Frame grabber cards and related autofocus circuits are widely discussed in the literature. See, for instance, Bravo-Zanoguera, "High-Performance Autofocus Circuit for Biological Microscopy", Review of Scientific Instruments, Volume 69, Number 11 (November, 1998). In order to increase the execution speed of the focus algorithm, the controller 20 may execute dedicated firmware or low-level software such as C++ rather than high-level software such as MATLAB®. Massively parallel hardware, such as is present in commercial Graphics Processing Units, may also be employed to increase the execution speed.

The controller 20 can be implemented by a wide variety of platforms. For example, the controller 20 can be a dedicated system located within the housing for the objective lens 12, the primary image sensor 16, and the scanning stage 22. As another example, the controller 20 can be an external computer (such as a general-purpose personal computer) located outside the housing that may include a keyboard, a mouse, a monitor and a frame grabber card and is electrically connected to the primary image sensor 16 and the scanning stage 22 by cables or wirelessly.

Figure 11:
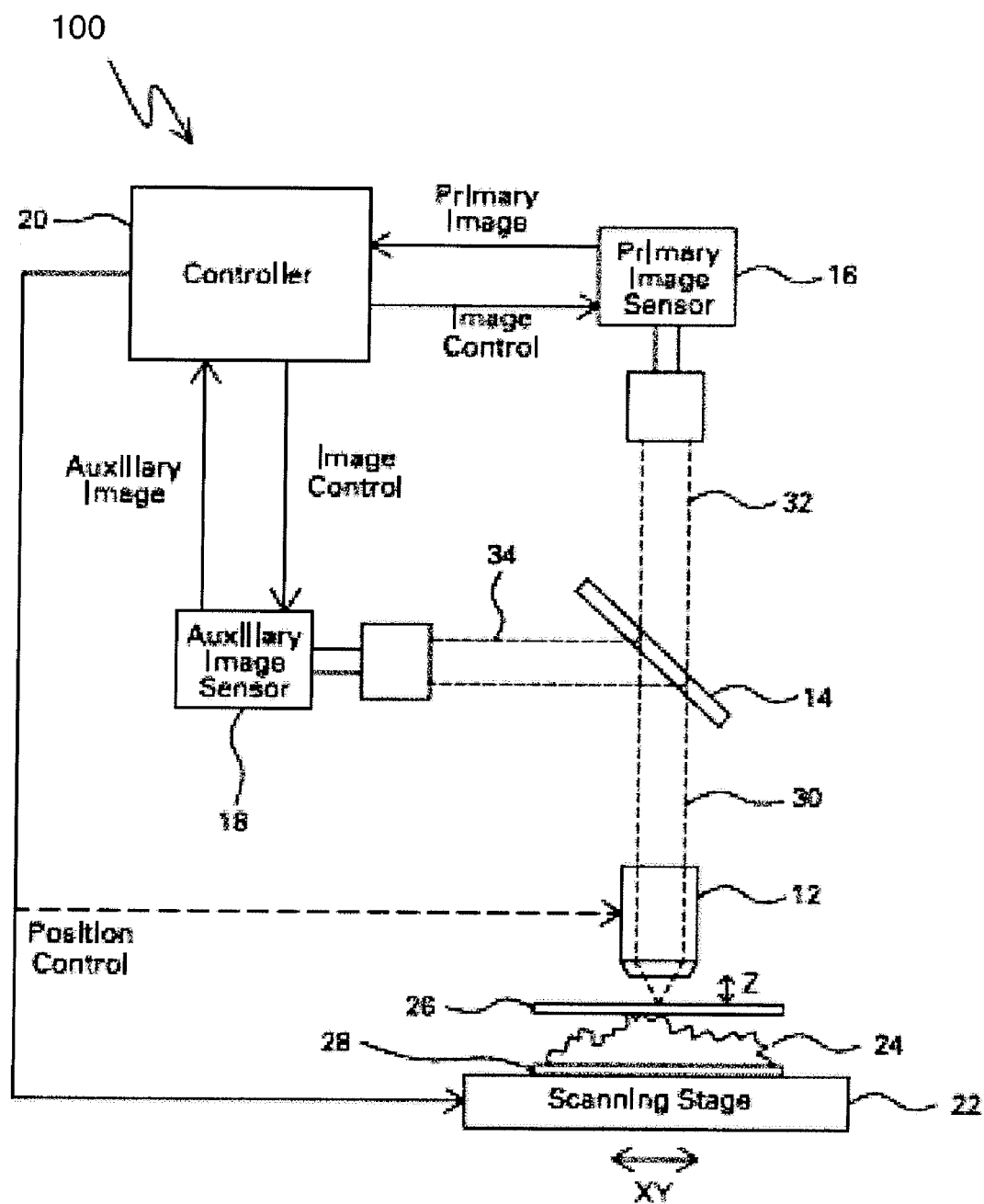
FIG. 11 illustrates an imaging device including dual image sensors and dual light paths in accordance with an alternative embodiment of the invention.

FIG. 11 illustrates an imaging device 100 including dual image sensors and dual light paths in accordance with an alternative embodiment of the invention. The imaging device 100 illustrated in FIG. 11 is substantially similar to the imaging device 10 depicted in FIG. 1, however, the imaging device 100 further includes an auxiliary image sensor 18 and a beam splitter 14 which splits light 30 into a primary light path 32 and an auxiliary light path 34. The primary light path 32 is directed to primary image sensor 16, and the auxiliary light path 34 is directed to the auxiliary image sensor 18. In one embodiment, the beam splitter 14 may be a partial reflection filter (or partially transparent mirror) that transmits one half of light 30 to the primary light path 32 and reflects the other half of light 30 to the auxiliary light path 34 when bright field imaging is used. In one embodiment, the beam splitter 14 may be a wavelength discrimination filter (or dichroic mirror) that transmits light that includes the fluorescent excitation wavelength to the primary light path 32 and reflects light that excludes the fluorescent excitation wavelength to the auxiliary light path 34 when fluorescent imaging is used.

In one embodiment, the primary image sensor 16 may generate a primary image of the sample 24 at a particular field of view using primary light path 32 without using the auxiliary light path 34. Moreover, the auxiliary image sensor 18 may generate an auxiliary image of the sample 24 at the same field of view, or at a region or regions of interest within the field of view, using the auxiliary light path 34 without using the primary light path 32. In one embodiment, the primary image sensor 16 generates the primary image with a primary pixel count at a primary frame rate, and the auxiliary sensor 18 generates the auxiliary image(s) with an auxiliary pixel count at an auxiliary frame rate. In one embodiment, the auxiliary pixel count is substantially lower than the primary pixel count, and as a result, the auxiliary frame rate is substantially faster than the primary frame rate.

As with the primary image sensor 16, the auxiliary image sensor 18 may be a commercially available CCD based image sensor. In one embodiment, the primary pixel count may be at least four times as large as the auxiliary pixel count, and the auxiliary frame rate may be at least four times as fast as the primary frame rate. In one embodiment, the primary pixel count may be at least ten times as large as the auxiliary pixel count, and the auxiliary frame rate may be at least ten times as fast as the primary frame rate.

In accordance with one embodiment, the imaging system 100 may capture first, second and third auxiliary images of the sample 24 using the auxiliary image sensor 18 while the sample is respectively positioned at first, second and third sample distances and at first, second and third lateral positions. The controller 20 or other processor may determine a quantitative characteristic for each of the first, second and third auxiliary images using, for example, the Brenner Gradient. The controller 20 may then determine a primary sample distance for the next primary image based upon at least the quantitative characteristics for the first, second, and third images. A primary image of the sample for the given field of view may be captured using the primary image sensor 16 at the primary sample distance and at a primary lateral position that is offset from the first, second and third lateral positions. By using a combination of a primary image sensor coupled with an auxiliary image sensor having a faster frame rate, overall capture rate of the entire sample 24 can be increased.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of autofocusing a sample to obtain a plurality of sequential primary images representative of the sample, the method comprising:
   capturing a first auxiliary image of the sample, the first auxiliary image captured at a first sample distance and at a first lateral position determined with respect to an objective;
   determining a quantitative characteristic for the first auxiliary image;
   capturing a second auxiliary image of the sample, the second auxiliary image captured at a second sample distance and at a second lateral position that is offset from the first lateral position;
   determining a quantitative characteristic for a second auxiliary image;
   capturing a third auxiliary image of the sample, the third auxiliary image captured at a third sample distance and at a third lateral position that is offset from the first and second lateral positions;
   determining a primary sample distance based upon at least the quantitative characteristics for the first, second, and third auxiliary images; and
   capturing a primary image of the sample at the primary sample distance determined from the quantitative characteristics for the first, second and third auxiliary images and at a primary lateral position that is offset from the first, second and third lateral positions.

2. The method of claim 1, wherein the sample distances vary in a vertical direction between the objective lens and the sample.

3. The method of claim 2, wherein the lateral positions vary substantially orthogonally with respect to the vertical direction.

4. The method of claim 2, wherein the sample is moved continuously between capturing of the first auxiliary image and the primary image in the lateral direction relative to the objective.

5. The method of claim 1, wherein determining a quantitative characteristic comprises determining a difference in intensities between each pixel and at least one other pixel in a captured image.

6. The method of claim 1, wherein determining a quantitative characteristic comprises determining, for each pixel in a captured image, a difference in intensities between each respective pixel and a neighboring pixel laterally separated from the respective pixel by at least one other pixel.

7. The method of claim 1, wherein determining a primary sample distance comprises interpolating the primary sample distance in accordance with a quadratic or Lorentzian distribution based upon the quantitative characteristics for the first, second and third auxiliary images.

8. The method of claim 1, wherein determining a quantitative characteristic comprises determining, for each pixel in a captured image, a difference in intensities between each respective pixel and a neighboring pixel laterally separated from the pixel by at least one other pixel, and summing the squared difference in intensities for each pixel across the height and width of the image.

9. The method of claim 8, wherein determining a primary sample distance comprises interpolating the primary sample distance by fitting at least the quantitative characteristics or the first, second and third images to a Lorentzian curve and identifying a maxima on the curve.

10. The method of claim 9, wherein one primary image of the sample is used in determining the primary sample distance of the sequentially next primary image of the sample.

11. The method of claim 8, wherein determining a primary sample distance comprises interpolating the primary sample distance by fitting at least an inverse of the quantitative characteristic for the first image and an inverse of the quantitative characteristic for the second image to a quadratic curve and identifying a minima on the curve.

12. The method of claim 11, wherein one primary image of the sample is used in determining the primary sample distance of the sequentially next primary image of the sample.

13. An imaging device comprising:
an image sensor that generates a plurality of sequential primary images of a sample;
an objective lens;
a stage that supports the sample to be imaged; and
a controller that adjusts a sample distance between the objective lens and the sample along an optical axis to autofocus the images as the relative positions of the sample and the objective lens are varied in a lateral direction substantially orthogonal to the optical axis, wherein the controller
captures a first auxiliary image of the sample, the first auxiliary image captured at a first sample distance and at a first lateral position,
determines a quantitative characteristic for the first auxiliary image,
captures a second auxiliary image of the sample, the second auxiliary image captured at a second sample distance and at a second lateral position that is offset from the first lateral position,
determines a quantitative characteristic for the second auxiliary image,
captures a third auxiliary image of the sample, the third auxiliary image captured at a third sample distance and at a third lateral position that is offset from the first and second lateral positions,
determines a quantitative characteristic for the third auxiliary image,
determines a primary sample distance based upon at least the quantitative characteristics for the first, second and third auxiliary images, and
captures a primary image of the sample at the primary sample distance determined from the quantitative characteristics for the first, second and third auxiliary images and at a primary lateral position that is offset from the first, second and third lateral positions.

14. The imaging device of claim 13, wherein one primary image of the sample is used in determining the primary sample distance of the sequentially next primary image of the sample.

15. The imaging device of claim 13, wherein the imaging device comprises a digital optical microscope.

16. The imaging device of claim 13, wherein the sample distances vary in a vertical direction between the objective lens and the sample.

17. The imaging device of claim 16, wherein the lateral positions vary substantially orthogonally with respect to the vertical direction.

18. The imaging device of claim 17, wherein the sample is moved continuously between capturing of the first auxiliary image and the primary image in the lateral direction relative to the objective.

19. The imaging device of claim 13, wherein determining a quantitative characteristic comprises determining, for each pixel in a captured image, a difference in intensities between the pixel and a neighboring pixel laterally separated from the pixel by at least one other pixel, and summing the squared difference in intensities for each pixel across the height and width of the image.

20. The imaging device of claim 19, wherein determining a primary sample distance comprises interpolating the primary sample distance by fitting at least the quantitative characteristics for the first, second and third auxiliary images to a Lorentzian curve and identifying a maxima on the curve.

21. The imaging device of claim 19, wherein determining a primary sample distance comprises interpolating the primary sample distance by fitting at least an inverse of the respective quantitative characteristics for the first, second and third images to a quadratic curve and identifying a minima on the curve.

* * * * *